US006973542B1

(12) United States Patent
Schmuck et al.

(10) Patent No.: US 6,973,542 B1
(45) Date of Patent: Dec. 6, 2005

(54) DETECTING WHEN TO PREFETCH INODES AND THEN PREFETCHING INODES IN PARALLEL

(75) Inventors: Frank B. Schmuck, Campbell, CA (US); James C. Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 09/618,420

(22) Filed: Jul. 18, 2000

(51) Int. Cl.[7] ............................................. G06F 12/00
(52) U.S. Cl. ...................................... 711/137; 712/307
(58) Field of Search ......................... 711/137, 154, 118, 711/158, 100; 712/207

(56) References Cited

U.S. PATENT DOCUMENTS

| | | | | |
|---|---|---|---|---|
| 5,367,656 A | * | 11/1994 | Ryan | 711/213 |
| 5,799,164 A | * | 8/1998 | Sollars | 712/207 |
| 5,829,031 A | * | 10/1998 | Lynch | 711/137 |
| 5,884,098 A | * | 3/1999 | Mason, Jr. | 711/213 |
| 6,032,216 A | * | 2/2000 | Schmuck | 710/200 |
| 6,317,810 B1 | * | 11/2001 | Lopez-Aguado | 711/120 |
| 6,442,682 B1 | * | 8/2002 | Pothapragada et al. | 713/1 |
| 6,477,621 B1 | * | 11/2002 | Lee | 711/120 |
| 6,484,239 B1 | * | 11/2002 | Hill | 711/137 |
| 6,502,157 B1 | * | 12/2002 | Batchelor | 710/310 |
| 6,557,079 B1 | * | 4/2003 | Mason, Jr. | 711/137 |
| 6,574,712 B1 | * | 6/2003 | Kahle | 711/137 |
| 6,647,487 B1 | * | 11/2003 | Undy et al. | 712/207 |

OTHER PUBLICATIONS

Wei, L. et al.—Prefetching and Caching Metadata in a Distributed NFS Server, Dec., 2000., IEEE 4th Conference on Algorithms and Architectures on Parallel Processing, Hong Kong.*

* cited by examiner

Primary Examiner—Kimberly McLean-Mayo
(74) Attorney, Agent, or Firm—Lawrence D. Cutter, Esq.; Blanche E. Schiller, Esq.; Heslin Rothenberg Farley & Mesiti P.C.

(57) ABSTRACT

The decision to prefetch inodes is based upon the detecting of access patterns that would benefit from such a prefetch. Once the decision to prefetch is made, a plurality of inodes are prefetched in parallel. Further, the prefetching of inodes is paced, such that the prefetching substantially matches the speed at which an application requests inodes.

12 Claims, 5 Drawing Sheets

DETECTING WHEN TO PREFETCH INODES AND THEN PREFETCHING INODES IN PARALLEL

TECHNICAL FIELD

This invention relates, in general, to parallel data processing, and in particular, to the parallel prefetching of file meta data.

BACKGROUND ART

A parallel, shared disk file environment includes a set of computer nodes, disk storage devices, a communications network, and a parallel file system running on each computer node. A parallel file system differs from a traditional distributed file system, like the Network File System (NFS) or the Distributed File System (DFS), in that with a parallel file system, data belonging to the same file is distributed or "striped" across disks that are attached to different nodes in the environment or directly attached to the network. A parallel file system allows data to be transferred between disks and computer nodes without requiring all the data to pass through a single server node.

The meta data of files, which includes the file attributes, such as file size, last-modified time, and file owner, are also striped across the disks in a parallel file system. That is, the various data structures that include the meta data (referred to as inodes) are stored on different disks.

Applications executing in a computing environment, regardless of whether the environment employs a traditional or parallel file system, often request a directory listing of the files of a directory including the file attributes. In order to provide this listing, the file system reads all of the inodes of the files of the requested directory. However, for a large directory, reading inodes one at a time can be very time consuming.

In traditional file systems, the problem of reading inodes efficiently has been addressed by clustering inodes. That is, by arranging for inodes of files of the same directory to be close together on disk (e.g., grouped together in inode blocks). Thus, instead of reading individual inodes, a whole block of inodes is read in a single I/O. Since inodes are typically small, the cost of reading a block of inodes is not much higher than reading a single inode, and reading a whole block of inodes is significantly faster than reading each inode individually.

However, this solution is not well-suited for a parallel file system for at least the following reasons:

1. Applications running on a parallel file system may concurrently access different inodes of the same directory (for example, a parallel mail server). If all of these inodes are clustered within the same inode block, then all I/Os to read or write these inodes will go to the same disk, causing access to these inodes to become a bottleneck.

2. A parallel file system requires distributed locking to synchronize access to file data and meta data from multiple nodes in the network. To read a whole block of inodes would require getting a lock on each of the inodes in the block, requiring messages to a lock coordinator. Therefore, in a parallel file system, the cost of reading a whole block of inodes is significantly higher than the cost of reading a single inode. Hence, an approach that always caches only whole inode blocks would speed up inode access only if the locking granularity were increased, so that each lock pertains to a whole block of inodes instead of an individual inode. However, this would significantly increase the number of lock conflicts due to "false sharing" between nodes: If two nodes were concurrently updating different inodes within the same inode block, then each inode update would require messages and possibly I/O to revoke the lock on the inode block from the other node.

Thus, a need still exists for an efficient technique for reading inodes of a parallel file system. In particular, a need exists for a facility that manages when and how to prefetch inodes.

SUMMARY OF THE INVENTION

The shortcomings of the prior art are overcome and additional advantages are provided through the provision of a method of managing the prefetching of data of files. The method includes, for instance, detecting a pattern of requests for data of multiple files; and prefetching data of a plurality of files, in response to the detecting indicating the pattern.

In another aspect of the present invention, a method of managing the prefetching of data is provided. The method includes, for instance, controlling the prefetching of data of a plurality of files by pacing at least the initiating of the prefetching based upon requests for data; and prefetching the data of the plurality of files, in response to the controlling.

In yet a further aspect of the present invention, a method of managing the prefetching of inodes associated with files of a directory is provided. The directory includes one or more directory blocks and each directory block has associated therewith zero or more files. The method includes, for example, detecting a pattern of requests for multiple inodes associated with multiple files of a directory block of the one or more directory blocks; and prefetching a plurality of inodes associated with the directory block, in response to detecting the pattern.

System and computer program products corresponding to the above-summarized methods are also described and claimed herein.

The prefetching capabilities of the present invention advantageously increase the speed at which inodes are read. In one aspect of the present invention, a technique is provided for deciding when to prefetch data (e.g., inodes) by detecting access patterns that would benefit from such a prefetch. In a further aspect of the present invention, inodes are prefetched (at least some in parallel) at an average rate that substantially matches the speed at which an application requests file attribute data.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for deciding when to prefetch data (such as, meta data) by detecting access patterns that would benefit from such a prefetch. Further, in another aspect of the present invention, a capability is provided for prefetching data (e.g., meta data) at an average rate that substantially matches the speed at which an application requests data. In one example, at least some of the data is prefetched in parallel.

As used herein, data refers to any information associated with or located within a file. Further, file is used to refer to any type of entity that holds information or has information associated therewith.

Figure 1:
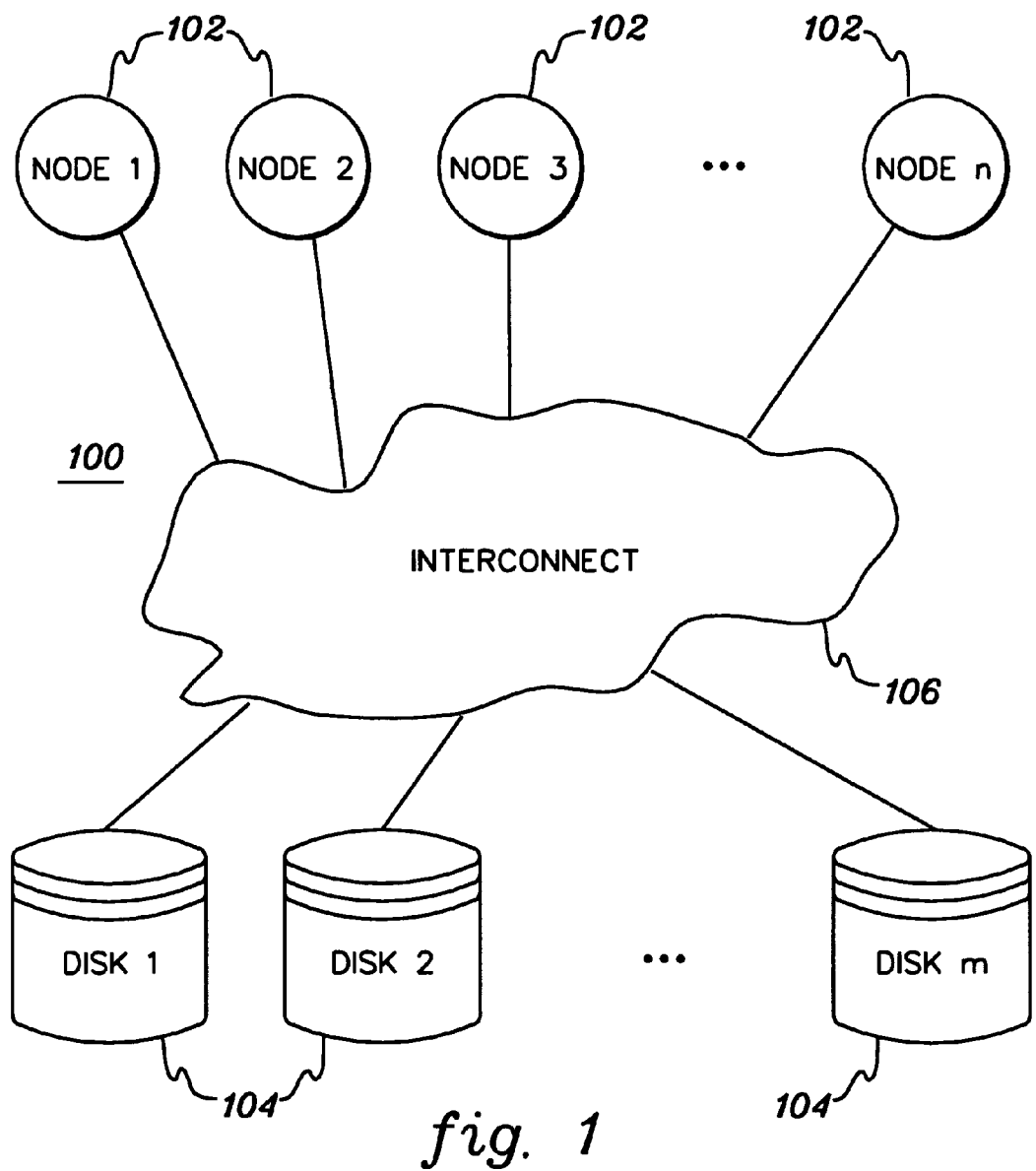
FIG. 1 depicts one example of a computing environment incorporating and using one or more aspects of the present invention.

One embodiment of a computing environment incorporating and/or using aspects of the present invention is described with reference to FIG. 1. Computing environment 100 includes one or more nodes 102 (e.g., Node 1, . . . Node n), which share access to one or more storage devices 104 (e.g., Disk 1 . . . Disk m). The nodes are coupled to each other and to the storage devices via an interconnect 106. In one example, the interconnect includes a wire connection, token ring or network connection, to name just a few examples. One communications protocol used by one or more of these connections is TCP/IP.

Figure 2:
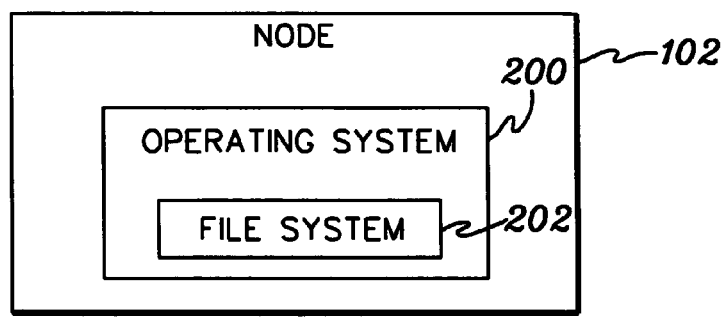
FIG. 2 depicts further details of a node of FIG. 1, in accordance with an aspect of the present invention.

As one example, a node 102 includes an operating system 200 (FIG. 2), such as the AIX operating system, offered by International Business Machines Corporation. The operating system includes a file system 202 (e.g., a software layer), such as the General Parallel File System (GPFS), offered by International Business Machines Corporation, which is used to manage one or more files located in the various storage devices.

Figure 3:
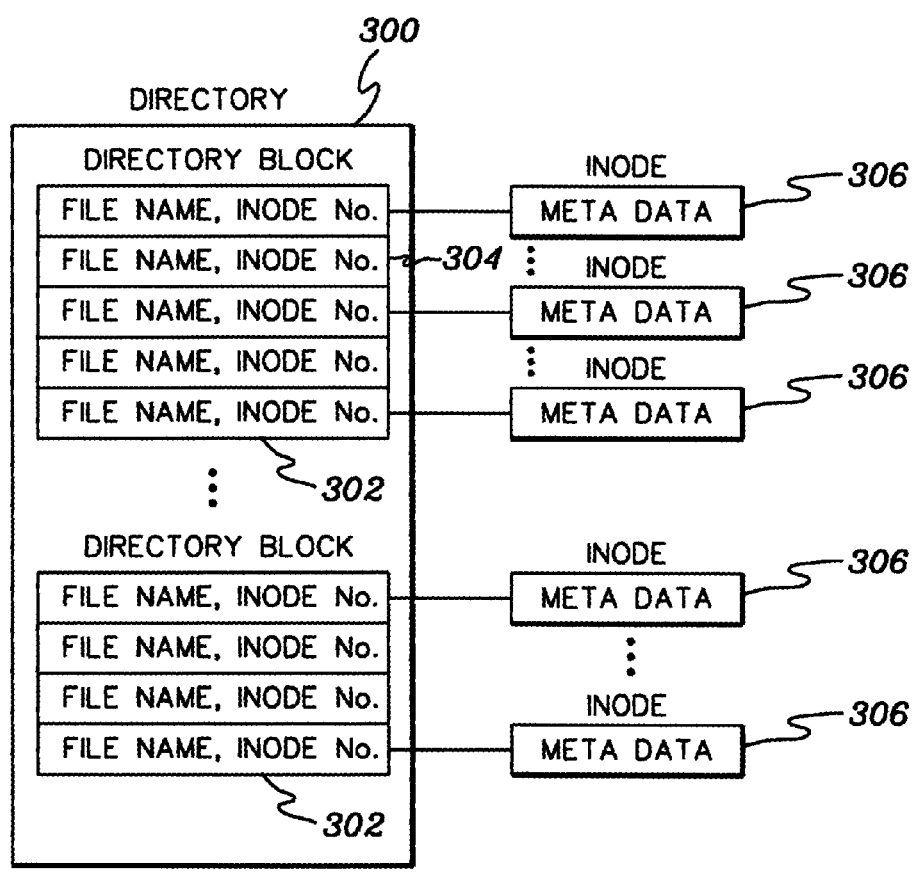
FIG. 3 depicts one example of a directory partitioned into a plurality of directory blocks, each directory block having zero or more directory entries, and each entry having associated therewith an inode, in accordance with an aspect of the present invention.

In one example, each file is associated with a directory and in particular, with a directory block of a directory. Thus, as shown in FIG. 3, a directory 300 includes one or more directory blocks 302, and each directory block 302 has associated therewith zero or more files 304. (A computing environment may include one or more directories.)

Further, each file has associated therewith meta data 306 that includes, for example, file attributes, such as file size, last-modified time, and file owner. This meta data is contained within a data structure, referred to as an inode.

One aspect of managing files includes the management of the data associated with the files, including the management of the meta data or inodes. This management includes, for instance, increasing the speed at which applications read inodes by detecting when prefetching of inodes is to occur, and then prefetching inodes by issuing I/O requests to multiple storage devices (e.g., disks) in parallel.

In one aspect of the present invention, the decision to prefetch inodes is based on detecting access patterns that would benefit from such a prefetch. Most file systems do not provide an interface that allows retrieving attributes from multiple files in a single call. For example, the UNIX Standard file system interface provides a readdir call, which returns the names of the files stored in the directory, and a stat call which takes the name of a single file and returns the attributes of that file, but does not provide a single call that returns the attributes of all files of a directory. This means that applications written for a UNIX or UNIX-like file system cannot communicate to the file system their intent to retrieve attributes for all files of a directory. Instead, in order to support such applications efficiently, in accordance with an aspect of the present invention, the file system is to infer that fact from a sequence of file system calls made by the application.

One embodiment of the logic employed to determine when to prefetch data (such as meta data of inodes) is described with reference to FIG. 4. In one example, this logic is employed by one or more file systems.

Figure 4:
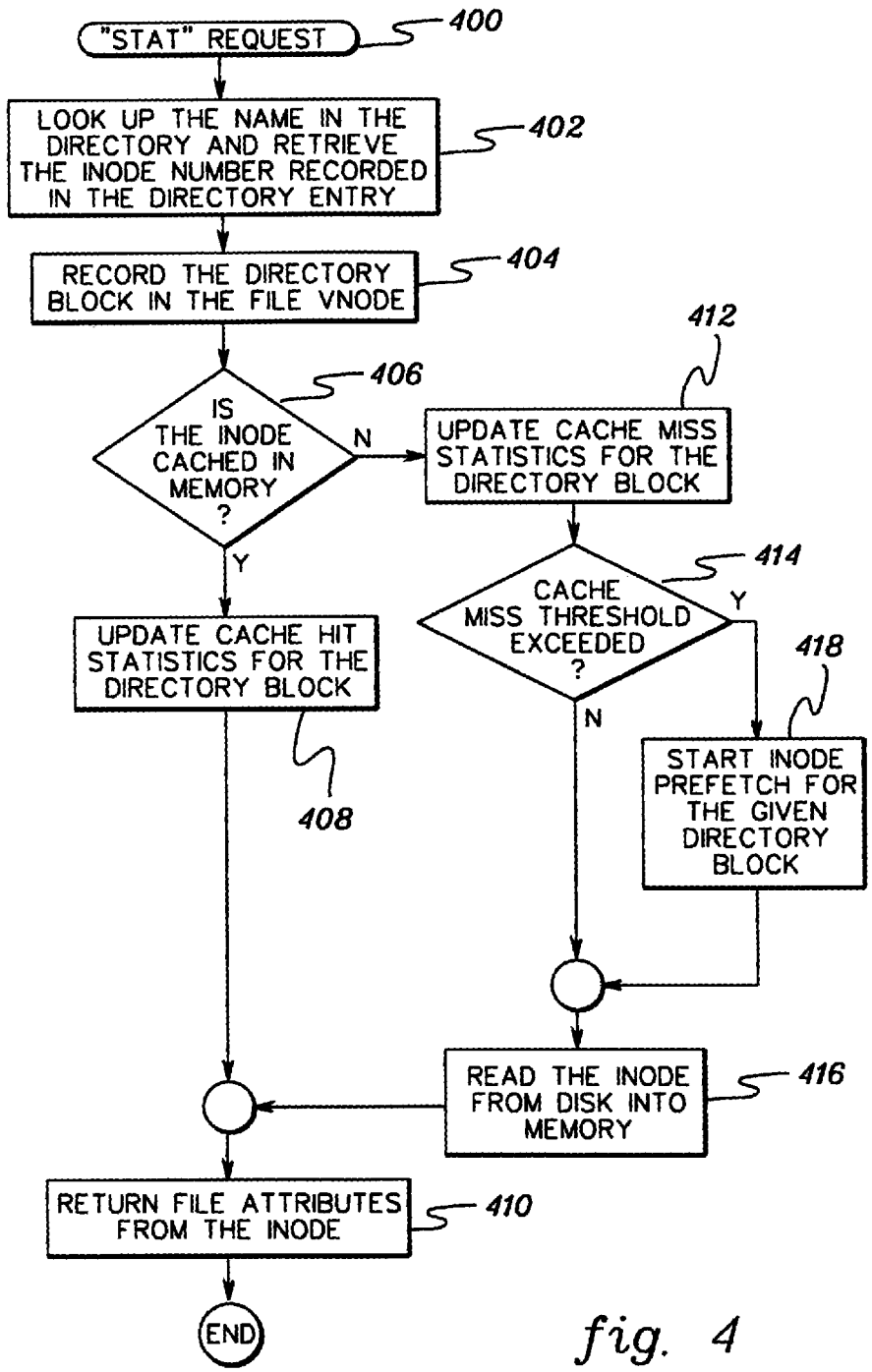
FIG. 4 depicts one embodiment of the logic used to collect inode access statistics and to start inode prefetch, in accordance with an aspect of the present invention.

Referring to FIG. 4, initially, a stat call is issued by an application, STEP 400. When the stat request is issued, the file name indicated in the request is looked up in the current directory indicated by the application, STEP 402. If the file name is found, the directory entry contains a reference to the inode (e.g., an inode number) that stores the attributes of the file.

From this information, an in-memory control structure for accessing the file is built, STEP 404. This control structure is referred to as a vnode. Recorded within the vnode is, for example, a reference to the directory and the logical block number of the directory block in which the file name was found.

Figure 5:
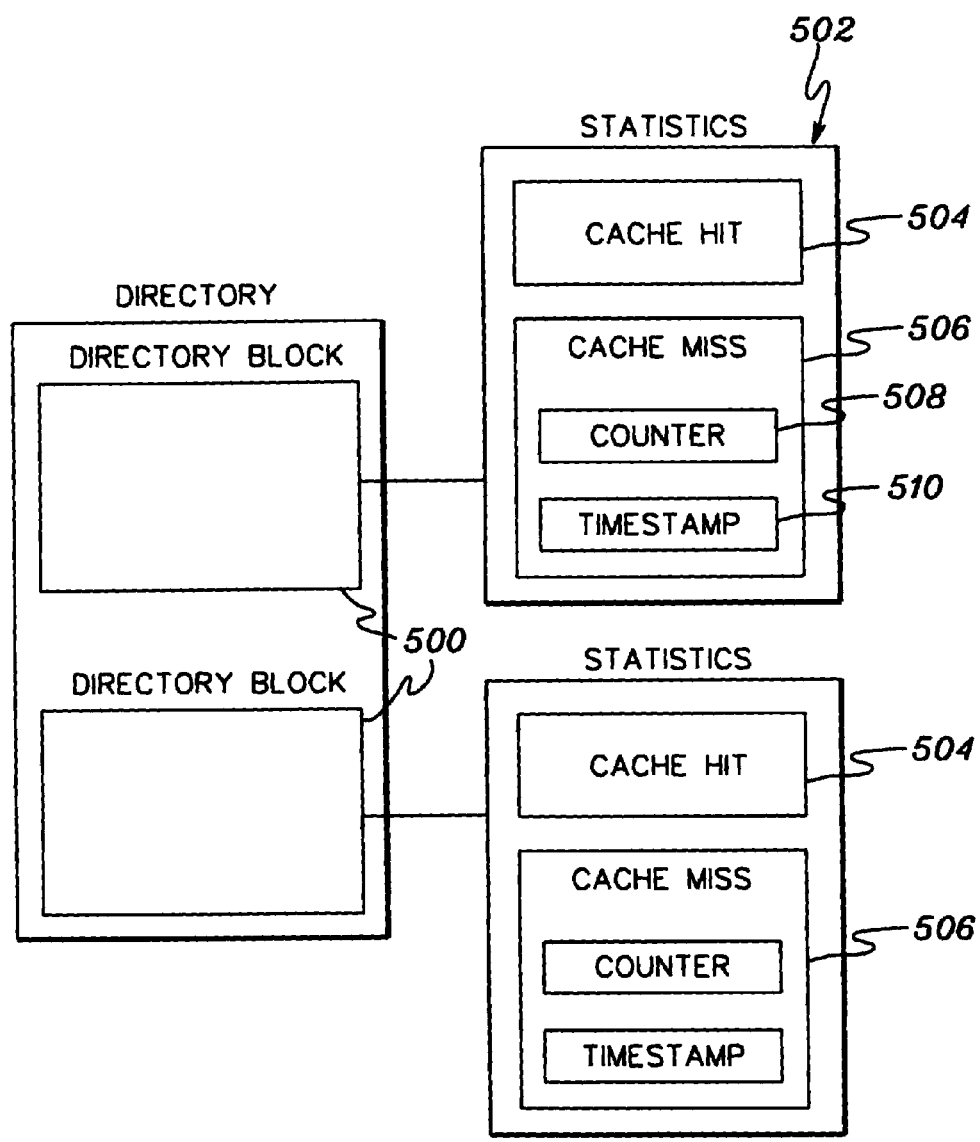
FIG. 5 depicts one example of various statistics associated with each directory block of FIG. 3, in accordance with an aspect of the present invention.

Thereafter, a determination is made as to whether the inode is cached in memory, INQUIRY 406. If the inode has been accessed in the past, it still might be cached in memory. If it is cached in memory, then cache hit statistics for the directory block are updated, STEP 408. In particular, there are various statistics associated with each directory block. For example, as shown in FIG. 5, each directory block 500 has associated therewith various statistics 502, including cache hit statistics 504 and cache miss statistics 506. Cache miss statistics 506 include a counter 508 and a timestamp 510, which are described below.

Returning to FIG. 4, subsequent to updating the cache hit statistics for the directory block, the file attributes from the inode are returned, STEP 410.

Returning to INQUIRY 406, if the inode is not cached in memory, then cache miss statistics 506 (FIG. 5) for the directory block are updated, STEP 412. In particular, if the inode of the file was not found in the cache, the corresponding statistics counter 508 associated with that directory block is incremented. If timestamp 510 associated with that counter is older than a predetermined time interval I (e.g., one second or so), the counter is reset to zero before it is incremented. Then, the current time is recorded in the timestamp. Thus, a counter value of n associated with a directory block b means that n times within a time period of length at most n×I, an inode for a file in b needed to be read from disk.

Thereafter, a determination is made as to whether a cache miss threshold has been exceeded, INQUIRY 414. For example, the value of counter 508 is compared to the cache miss threshold (e.g., 5). If the cache miss threshold has not been exceeded, then the inode is read from disk into memory, STEP 416 (FIG. 4), and the file attributes are returned, STEP 410.

Otherwise, when counter 508 (FIG. 5) exceeds the predetermined threshold value, INQUIRY 414 (FIG. 4), this is an indication that the application is likely to request attributes for all (or at least a large subset) of the files of the directory, and that most or all of the inodes of these files are not currently cached. Hence, this is an indication that this application would benefit from inode prefetch.

Thus, inode prefetch is initiated for the given directory block, STEP 418, and the requested inode is read from disk into memory, STEP 416. Thereafter, the file attributes are returned, STEP 410. (In another example, the requested inode is also read as part of the prefetching, described below.) One embodiment of the logic associated with prefetching inodes is described with reference to FIG. 6. In one embodiment, this logic is performed by one or more file systems.

Figure 6:
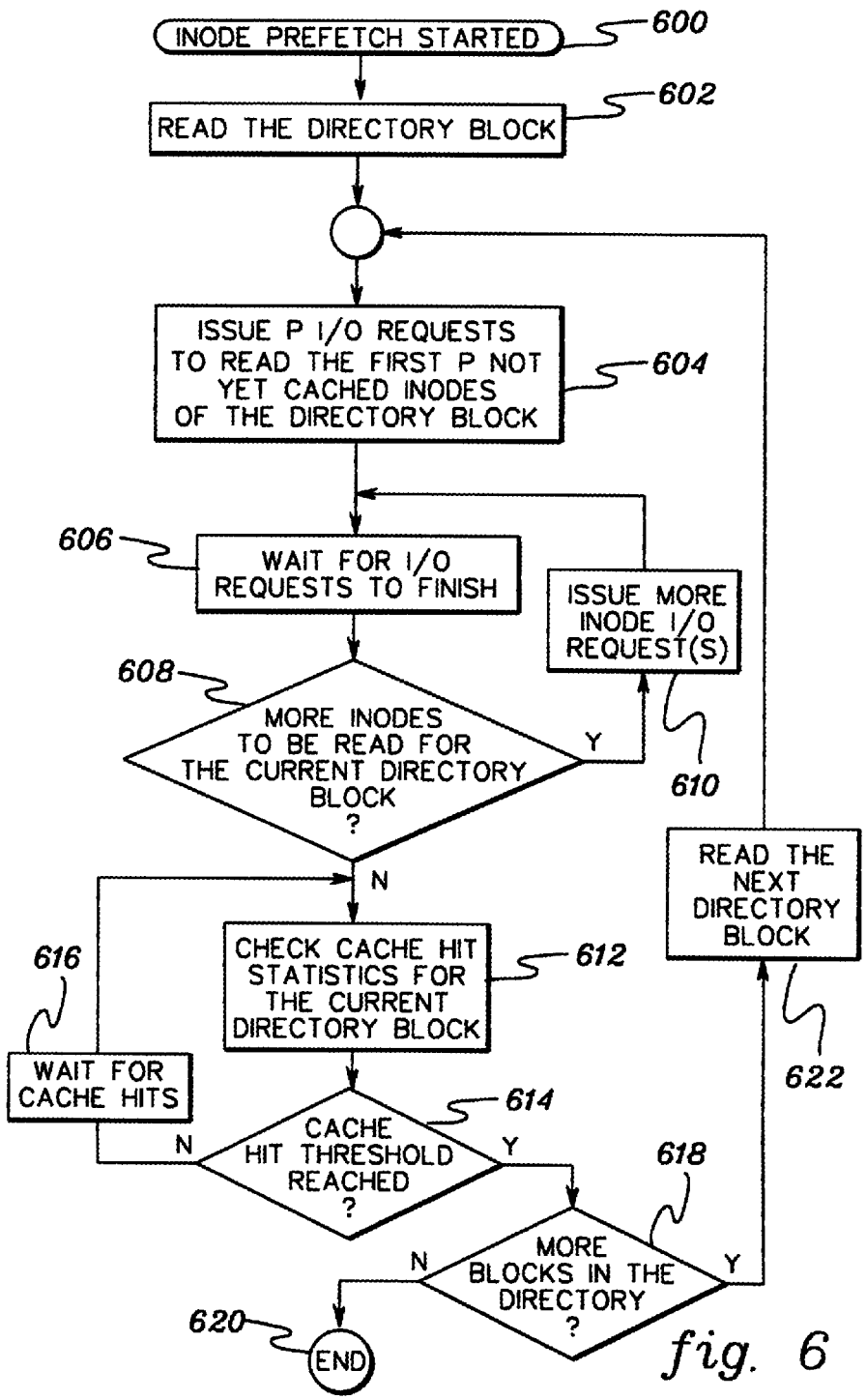
FIG. 6 depicts one embodiment of the logic used to prefetch inodes in parallel, in accordance with an aspect of the present invention.

Referring to FIG. 6, when one of the statistic counters reaches its threshold value, the prefetching of inodes is started, STEP 600. For example, the directory block that the counter is associated with is accessed and a list of inode numbers for all (or a subset) of the files of that directory block is extracted, STEP 602. For each inode in the list, a check is made as to whether the inode is currently cached. If the inode is cached, then the prefetch continues on to the next inode. However, if the inode is not cached, then the inode is read from disk, as described herein.

In accordance with an aspect of the present invention, a plurality of inodes are read from a plurality of disks (or storage devices) in parallel. In particular, up to some number p of I/Os are started in parallel to read the first p not cached inodes of the directory block, STEP 604 (FIG. 6). (P is the degree of parallelism and is a predetermined value based on the number of disks in the file system (e.g., two times the number of disks).) Each time one of the p I/O requests completes, STEP 606, a determination is made as to whether there are more inodes to be read for the current directory block that are not yet cached, INQUIRY 608. If there are more inodes to be read, then one or more other inode I/O requests are issued, STEP 610.

Since inodes are striped across the disks, reading inodes in parallel will be up to k times faster than reading them one at a time, where k is the number of disks. As the application continues to request file attributes out of the same directory block, the file system will be able to satisfy most of these requests out of the cache. The net effect will be that attributes will be returned to the application up to k times faster than without inode prefetch.

Returning to INQUIRY 608, if there are no more inodes to be read for the current directory block, then cache hit statistics 504 (FIG. 5) for the current directory block are checked, STEP 612 (FIG. 6). These statistics are used to determine when to prefetch inodes out of the next directory block. That is, once all of the inodes associated with one directory block have been prefetched, a decision is made as whether to prefetch inodes associated with another directory block of the directory. In order to make this decision, a check is made as to the current cache hit statistics for the current directory, STEP 612. If this number is below a cache hit threshold (e.g., a predetermined fraction of the total number of files of the directory block), INQUIRY 614, then the inode prefetch will wait for the application to catch up, STEP 616.

However, once the stat count has reached the predetermined fraction, INQUIRY 614, a determination is made as to whether there are more blocks in the directory, INQUIRY 618. If not, then prefetching is complete, STEP 620. However, if there are more blocks, then inode prefetch continues by reading inodes for files of the next directory block, STEP 622. This is done in the manner described herein.

Using the above-described technique, inodes are prefetched in parallel, one directory block at a time, at an average rate that substantially matches the speed at which the application accesses these inodes. For example, if a fraction of 50% is chosen, this technique ensures that not more than 1½ directory blocks worth of inodes are prefetched ahead of the application. In particular, once the prefetching of inodes from one directory block is completed, it is desirable to start prefetching inodes from the next directory block before the application starts requesting attributes of those inodes. Otherwise, if the access pattern detection mechanism described above was relied upon to trigger the inode prefetch for the next directory block, then for every directory block there would be a delay to reach the necessary threshold before the remaining inodes would be read. Depending on parameters, such as average file name length, directory block size, etc., the number of files per directory block may be small enough for this delay to significantly reduce the speed-up that could otherwise be had from the parallel inode prefetch. On the other hand, simply prefetching all of the remaining inodes in the directory as fast as possible would also not be satisfactory, because the total number of files of the directory may be larger than the number of inodes that fit in the cache. Prefetching inodes faster than the application issues stat calls would cause inode prefetch to throw inodes out of the cache that had been prefetched earlier, but have not yet been accessed by the application. This would negate any benefits of the inode prefetch.

Described in detail above is one embodiment of efficiently determining when to prefetch inodes and the prefetching of those inodes in parallel. Although the embodiments described herein refer to inodes, the capabilities of the present invention are not limited to inodes. One or more aspects of the present invention can be employed in reading other types of data.

The capabilities of the present invention are well suited for many types of situations and/or applications, including, for instance, applications that recursively traverse a directory tree, reading part of a directory, descending into a subdirectory, and then resume reading the parent directory upon returning from the subdirectory. The pacing mechanism described herein would suspend the inode prefetch for the parent directory, while its subdirectory is being processed, prefetch inodes for the subdirectory as necessary, and then resume prefetching inodes from the parent once the application continues accessing the parent directory.

The above-described computing environment is offered as only one example. One or more aspects of the present invention can be incorporated and used with many types of computing units, computers, processors, nodes, systems, workstations and/or environments without departing from the spirit of the present invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing the prefetching of inodes associated with files of a directory, said directory comprising one or more directory blocks, and each directory block having associated therewith zero or more files, said method comprising:
   detecting a pattern of requests for multiple inodes associated with multiple files of a directory block of said one or more directory blocks, wherein the pattern is based on directory entries of the multiple files being within said directory block, and wherein said directory block has associated therewith a counter and a cache miss threshold, said counter representing a number of inodes associated with said directory block that were requested within a preselected amount of time and were not found in a cache, and wherein said detecting comprises comparing said counter to said cache miss threshold to determine whether said pattern exists; and
   prefetching a plurality of inodes associated with said directory block, in response to detecting said pattern.

2. The method of claim 1, wherein said prefetching comprises prefetching at least a portion of said plurality of inodes in parallel.

3. The method of claim 1, further comprising initiating the prefetching of one or more inodes associated with another directory block of said directory, wherein said initiating is in response to requests for inodes of said directory.

4. The method of claim 3, wherein said initiating comprises determining whether a cache hit threshold has been reached, wherein said prefetching of one or more inodes associated with said another directory block is initiated when said cache hit threshold is reached.

5. A system of managing the prefetching of inodes associated with files of a directory, said directory comprising one or more directory blocks, and each directory block having associated therewith zero or more files, said system comprising:
   means for detecting a pattern of requests for multiple inodes associated with multiple files of a directory block of said one or more directory blocks, wherein the pattern is based on directory entries of the multiple files being within said directory block, and wherein said directory block has associated therewith a counter and a cache miss threshold, said counter representing a number of inodes associated with said directory block that were requested within a preselected amount of time and were not found in a cache, and wherein said means for detecting comprises means for comparing said counter to said cache miss threshold to determine whether said pattern exists; and
   means for prefetching a plurality of inodes associated with said directory block, in response to detecting said pattern.

6. The system of claim 5, wherein said means for prefetching comprises means for prefetching at least a portion of said plurality of inodes in parallel.

7. The system of claim 5, further comprising means for initiating the prefetching of one or more inodes associated with another directory block of said directory, wherein the initiating is in response to requests for inodes of said directory.

8. The system of claim 7, wherein said means for initiating comprises means for determining whether a cache hit threshold has been reached, wherein the prefetching of one or more inodes associated with said another directory block is initiated when said cache hit threshold is reached.

9. At least one program storage device readable by a machine, tangibly embodying at least one program of instructions executable by the machine, to perform a method of managing the prefetching of inodes associated with files of a directory, said directory having associated therewith one or more directory blocks and each directory block comprising zero or more files, said method comprising:
   detecting a pattern of requests for multiple inodes associated with multiple files of a directory block of said one or more directory blocks, wherein the pattern is based on directory entries of the multiple files being within said directory block, and wherein said directory block has associated therewith a counter and a cache miss threshold, said counter representing a number of inodes associated with said directory block that were requested within a preselected amount of time and were not found in a cache, and wherein said detecting comprises comparing said counter to said cache miss threshold to determine whether said pattern exists; and
   prefetching a plurality of inodes associated with said directory block, in response to detecting said pattern.

10. The at least one program storage device of claim 9, wherein said prefetching comprises prefetching at least a portion of said plurality of inodes in parallel.

11. The at least one program storage device of claim 9, wherein said method further comprises initiating the prefetching of one or more inodes associated with another directory block of said directory, wherein said initiating is in response to requests for inodes of said directory.

12. The at least one program storage device of claim 11, wherein said initiating comprises determining whether a cache hit threshold has been reached, wherein said prefetching of one or more inodes associated with said another directory block is initiated when said cache hit threshold is reached.

* * * * *